June 2, 1970          J. KASZMANN          3,515,103

ROTARY ENGINE

Filed June 21, 1967          2 Sheets-Sheet 1

INVENTOR

JOHN KASZMANN

BY

Agent

June 2, 1970  J. KASZMANN  3,515,103
ROTARY ENGINE

Filed June 21, 1967  2 Sheets-Sheet 2

INVENTOR
JOHN KASZMANN
BY
Frank J. Piper
Agent

United States Patent Office 3,515,103
Patented June 2, 1970

3,515,103
ROTARY ENGINE
John Kaszmann, 15 Dallas Road,
Willowdale, Ontario, Canada
Filed June 21, 1967, Ser. No. 647,845
Int. Cl. F02b 53/08
U.S. Cl. 418—59                                         8 Claims

ABSTRACT OF THE DISCLOSURE

A rotary internal combustion engine having a rotatable rotor or "piston" mounted within a cylindrical cavity. A plurality of work chambers are defined between the peripheral surface of the rotor and the cavity end wall such that the volume and degree of offset of the chambers with respect to the cavity axis varies as the rotor revolves. Means are provided for feeding expansile gaseous charges into the chamber from an extraneous source when the chambers are near the point of maximum offset such that the rotor is caused to revolve as the charges expand within the chambers.

---

This invention relates to an internal combustion engine of the rotary type.

The principal object of this invention is to provide a rotary internal combustion engine which is comprised of few component parts adapted to operate in synchronism with a minimum of frictional contact between moving parts and which will explode compressed charges of gaseous fuel mixture to produce direct rotary motion.

Another object of the invention is to provide a compact, efficient rotary engine which employs a novel rotor-casing arrangement which eliminates many of the serious gas sealing problems normally associated with rotary internal combustion engines.

A further object of this invention is to provide a novel rotary engine in which gaseous fuel charges are synchronously compressed from an extraneous source into inner work chambers where they are ignited to drive the rotor or "piston."

Another more specific object of the invention is to provide a rotary internal combustion engine wherein gaseous fuel charges are compressed in a series of outer chambers outside the rotor casing and the compressed fuel charges are introduced through valving means to working chambers within the rotor casing where they are ignited to drive the rotor and the combustion gases are exhausted by other valving means and wherein the means for compressing the fuel charges in the outer chambers and the inlet and exhaust valving means are directly and synchronously actuated by the rotational movement of the rotor.

These and other objects of the invention are achieved by means of a construction which includes a casing having a cylindrical cavity and a rotor or "piston" mounted within the cavity rotatable shaft. The rotor may have either a circular or elliptical peripheral surface. In the case of the circular rotor, it has a diameter less than that of the cylindrical cavity and is offset from the central axis of the cavity such that a portion of its peripheral surface is in freely movable but gas sealing engagement with the circular end wall of the cavity. A crescent-shaped chamber is thus defined between the cavity end wall and the peripheral surface of the rotor. Where the rotor is elliptical, it is centrally mounted in the cavity and the peripheral surface at each apex is in movable but gas sealing engagement with the circular cavity end wall. Thus, in this case, a pair of crescent-shaped chambers are defined between the cavity end wall and the peripheral surface of the rotor. In each case a plurality of equi-spaced, radially movable wall members divide the crescent chambers into a plurality of work chambers which vary in volume and degree to offset with respect to the central axis of the rotor as the rotor revolves within the cavity.

Also, in each case valve and port means are provided which are adapted to enable gaseous fuel charges to be compressed from a source outside the rotor cavity into the work chambers when the chambers are approaching a position of maximum offset with respect to the central axis of the rotor. The compressed fuel charges within the work chambers are then ignited and expand causing the rotor to revolve. The combustion gases are then exhausted from the work chambers through suitably positioned exhaust ports.

In a preferred embodiment, the fuel charges are compressed in a series of compression chambers arranged around the end wall of the rotor cavity and adapted to communicate with corresponding work chambers through valved inlet ports. The compression chambers are defined conjointly by the casing side walls, the outer surface of the cavity end wall, a movable ring member positioned around the rotor cavity end wall in spaced relation with respect thereto, and the same radially movable wall members that sub-divided the crescent chambers around the rotor. Compression of the charges is effected by the oscillatory motion of the movable ring member which is actuated by the radially movable wall members which, in turn, are actuated by the eccentric motion of the peripheral surface of the rotor.

The foregoing will be more fully understood upon referring to the following detailed description considered in conjunction with the accompanying drawings which illustrate embodiments of the invention. In the drawings.

Figure 1:
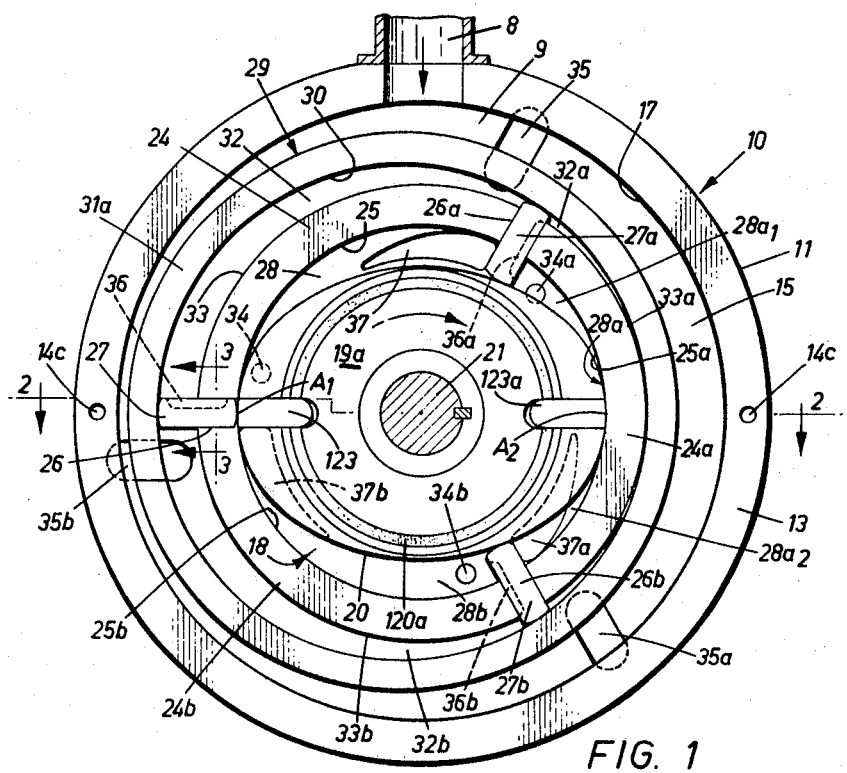
FIG. 1 is a diagrammatic plan view of an elliptical rotor engine in accordance with the invention with a side plate removed to show the configuration and positioning of the inner parts thereof.
Figure 2:
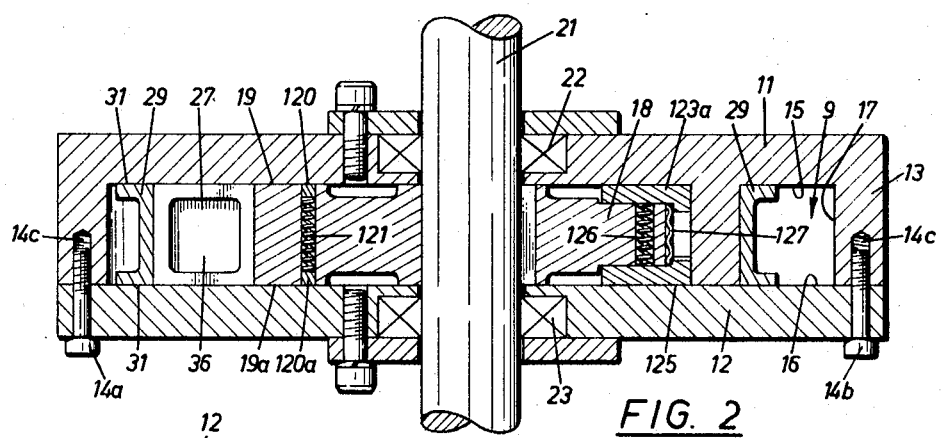
FIG. 2 is an end section, with the side plate in position, taken along the line 2—2 of FIG. 1.
Figure 3:
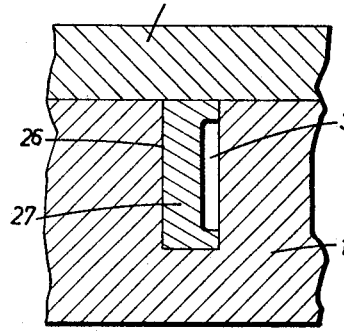
FIG. 3 is a detailed section taken along the line 3—3 of FIG. 1.

Referring particularly to FIGS. 1 through 4 in the drawings, the numeral 10 indicates the generally cylindrical engine casing which includes side plates 11 and 12 and circular end wall 13 which extends between the plates. Side plates 11 and 12 are secured together by bolts 14a, 14b through plates 11 and 12 and threaded into tapped holes 14c in end wall 13. A fuel inlet 8 opens into an outer cavity 9 through wall 13. The plates 11 and 12 have parallel, spaced-apart inner side wall surfaces 15, 16 and end wall 13 having a circular inner wall surface 17. A rotor 18 having parallel side walls 19, 19a and an elliptically contoured peripheral surface 20 is positioned between wall surfaces 15 and 16. The rotor is centrally fixed to shaft 21 which is journalled in bearings 22, 23 in side plates 11 and 12 to permit rotational movement of the shaft with its fixed rotor. Cylindrical casing 10 and rotor 18 are arranged and constructed such that the side walls 19, 19a of rotor 18 are in close but freely movable relationship with respect to the inner surfaces 15 and 16 of the casing. Semi-circular seals 120, 120a which are outwardly biased by spring means 121, are positioned in rotor surfaces 19 and 19a in gas sealing engagement with casing side walls 15 and 16.

Positioned concentrically with respect to shaft 21 and extending between walls 15 and 16 are three equi-spaced inner wall segments 24, 24a and 24b which define conjointly with wall surfaces 15, 16a a generally cylindrical inner cavity with arcuate inner end wall portions 25, 25a and 25b and three radial openings 26, 26a and 26b. The apexes $A_1$ and $A_2$ of rotor surface 20 are in closely but freely movable relationship to wall portions 25, 25a and 25b. A pair of radially slidable vanes 123, 123a are positioned in the rotor 18 at apexes $A_1$ and $A_2$ respectively. Vanes 123, 123a have sealing means 125 biased by springs 126 and 127 against surfaces 15, 16 and 25, 25a and 25b to provide a gas-tight seal therebetween.

Positioned in the radial openings 26, 26a and 26b are three radially movable divider members 27, 27a and 27b having flat end faces in slidable gas sealing engagement with surfaces 15 and 16 and arcuate end surfaces in contact with peripheral surface 20 of rotor 18.

Radially movable members 27, 27a and 27b divide the crescent-shaped chambers between rotor surface 20 and wall segments 24, 24a and 24b into a plurality of sub-chambers 28, 28a, 28b and 28c. It will be apparent that chambers 28, 28a, 28b and 28c are not fixed in volume or position. That is, as will be further explained hereinbelow, the volume of each chamber and its relative position with respect to the major and minor axes of the rotor varies as the rotor revolves.

Circumscribing members 27, 27a and 27b and inner wall segments 24, 24a and 24b is movable ring member 29. Ring 29 is spaced from wall segments 24, 24a, 24b and has a circular inner surface in gas sealing but movable contact with each of rollers 27, 27a and 27b and has parallel side walls 31, 31a spaced to permit gas sealed sliding contact with inner wall surfaces 15, 16 respectively. Members 27, 27a and 27b divide the space between the outer surfaces 33, 33a, 33b of segments 24, 24a, 24b and the circular inner surface 30 of ring 29, onto three outer compression chambers 32, 32a and 32b.

Because of the elliptical configuration of the rotor surface 20 and the 120° spacing of divider members 27, 27a and 27b around its centre, the end surfaces of the dividers remain in constant contact both with the peripheral surface 20 of rotor 18 and the inner surface 30 of ring 29 regardless of the position of rotor 18. As rotor 18 revolves, the volume of sub-chambers 28, 28a, 28b and 28c varies. The volume of any chamber immediately behind the rotor apexes, relative to the direction of rotation, increases as the rotor revolves and any chamber immediately ahead decreases in volume. Also, the relative positions and thereby the degree of offset of the chambers with respect to the major and minor axes of the rotor change as the rotor 18 revolves. For example, chambers 28a and 28b in FIG. 1 are approaching the point of maximum offset which will be reached when apex $A_1$ is at the radial centre line of member 27.

The rotation of rotor 18 imparts a radial reciprocatory motion of members 27, 27a and 27b which, in turn, impart an oscillatory motion to ring 29 with the degree of oscillation depending on the eccentricity of the rotor. As rotor 18 revolves, the motion of ring 29 cyclically increases and decreases the volume of chambers 32, 32a, 32b. For an engine having a rotor of a given size, the maximum volume of chambers 32, 32a and 32b will be determined by the degree of eccentricity of the rotor 18, the length of members 27, 27a, 27b and the radial thickness of segments 24, 24a, 24b. Preferably this thickness is selected such that the maximum distance between surface 30 and surfaces 33, 33a and 33b (measured at the centre line of the divider members) is equal to one-half the difference between the length of the major and minor axes of the rotor such that the minimum volume of outer chambers 32, 32a, 32b will approach zero.

A plurality of suitably positioned valving ports are provided which enable charges of gaseous fuel mixture to be taken into chambers 32, 32a, 32b when they are at or near their maximum volume and then to be compressed as their volume is decreased into a corresponding inner sub-chamber which is at or near the point of maximum offset. Fuel charges so-compressed within the inner work chambers are then detonated by spark plugs 34, 34a, 34b by suitably timed ignition means and the expansion of the detonated fuel charge drives the rotor. More specifically, in the embodiment shown in FIGS. 1 through 4, the valving ports include intake ports 35, 35a, 35b in the form of dished out portions formed in side plate 12 and communicating the outer cavity 9 with chambers 32, 32a and 32b respectively. These ports are shaped and positioned such that the passages they provide into the chambers are opened and closed by side wall 31a of ring 29 as it is oscillated, each port being open as the chamber with which it communicates approaches its maximum volume and being closed as the chamber volume begins to decrease after maximum volume has been reached.

Inner chamber inlet ports 36, 36a, 36b are formed in the side members 27, 27a, 27b and are adapted to communicate outer compression chambers 32, 32a, 32b with associated inner sub-chambers 28, 28a and 28c respectively when the corresponding work chamber is at or near the point of maximum offset. These ports consist of arcuate notches cut out of the sides of each of members 27, 27a and 27b to a depth slightly less than about half the thickness thereof as shown at 36b in FIG. 3. The radial movement of members 27, 27a, 27b effects opening and closing of ports 36, 36a and 36b respectively with the ports being closed when the members are at their maximum or minimum radial extension and being open when they are at an intermediate position. Exhaust ports 37, 37a, 37b are formed through side plate 12 communicating with chambers 28, 28b and 28c respectively. Ports 37, 37a and 37b are configured and positioned such that they are covered by side wall 19a of rotor 18 as the fuel charge is compressed into the detonated fuel charge in a work chamber and are uncovered after the detonated fuel charge has expanded to drive rotor 18.

In operation, as rotor 18 revolves through one complete revolution in the direction of the arrow in FIG. 1, six separate fuel charge compression, detonation and exhaust cycles occur. With the rotor in the position shown in FIG. 1, for example, valve port 35a communicating with compression chamber 32a is closed and the chamber is approaching its minimum volume. The fuel mixture contained in its original volume is being compressed through port 36a into chamber 28a. At this point and shortly beyond it, the degree of offset of chamber 28a from the central axis of the rotor is greater along the major radius of the rotor than along the minor radius. At the same time as the fuel charge is being compressed from chamber 32a to work chamber 28a, chamber 32 is near its maximum volume and inlet valve port 35 is open thus admitting a fuel charge to chamber 32. Valve ports 36 and 36a are closed thus confining the fuel charge to the outer chamber 32 at this stage. Also, at the same time, inlet valve port 35b communicating with chamber 32b is open and valve port 36b is closed. The volume of chamber 32b is increasing thus creating a vacuum which draws a fuel charge into this chamber. As the rotor rotates to a point where the apex $A_1$ is at the radial centre line of member 27, spark plug 34a ignites the fuel charge in chamber 28a expanding the fuel charge and driving the rotor 18 in the direction of the arrow in FIG 1.

Figure 4:
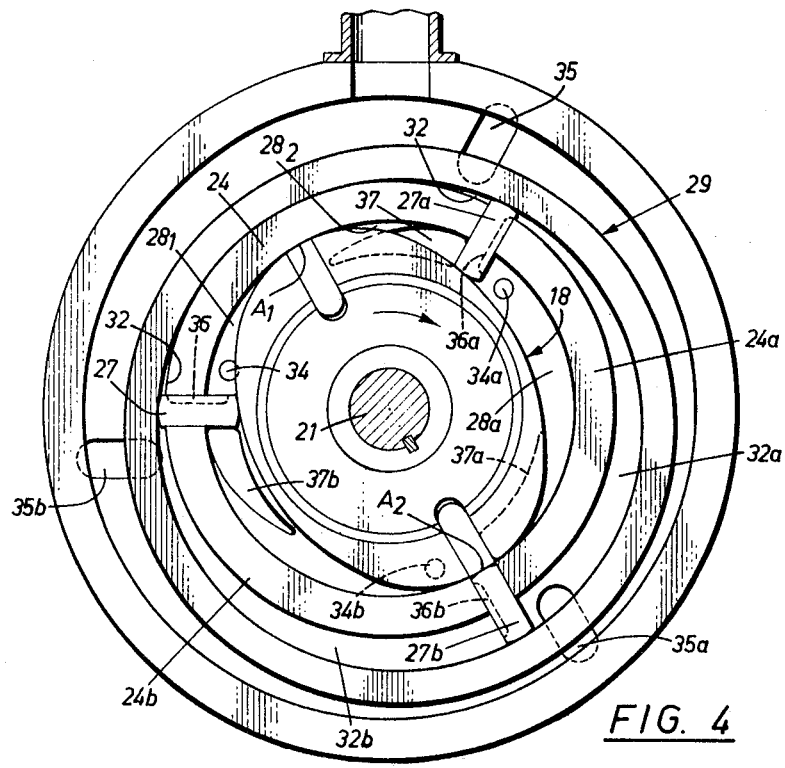
FIG. 4 is a plan view similar to FIG. 1 with the rotor advanced 60° from the position of FIG. 1.

As the rotor moves through 60° to the position shown in FIG. 4 such that apex $A_2$ approaches the radial centre line of member 27b, combustion gases from the fuel charge detonated in chamber 28a are exhausted through outlet port 37a which is now open. During this movement, inlet port 35 has been closed by ring 29, port 36 has been opened by the inward radial movement of member 26 and the fuel charge contained in chamber 32 is compressed through port 36 into chamber 28a which is now positioned immediately behind apex $A_1$. When apex $A_2$ is at the radial centre line of member 27, spark plug 34 ignites the new fuel charge which has been compressed into work chamber 28a, driving the rotor in the direction of the arrow in FIG. 4. With rotation, the combustion products from the second detonation are exhausted through outlet port 37, and a further compression, detonation and exhaust cycle will be initiated. Thus, with each 60° of rotation, work chamber 28a takes a new position and a compression, ignition, expansion and exhaust cycle takes place as described hereinabove, and there are, in effect, six "power strokes" per revolution. Lubrication is provided by mixing lubricants with the fuel and/or by a suitable pressure lubrication system adapted to distribute lubricants to areas of frictional contact between moving parts.

Figure 5:
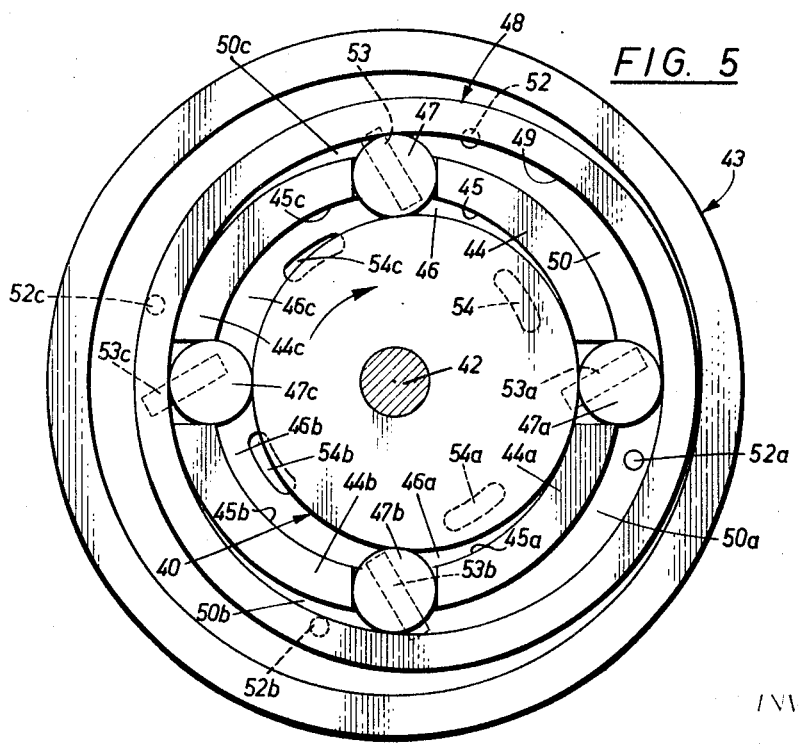
FIG. 5 is a plan view with side plate removed showing the rotary engine of this invention with a circular rotor.

In the embodiment of the invention illustrated in FIG. 5, rotor 40 has a circular peripheral surface 41 and is mounted eccentrically on a shaft 42 which is journalled in casing 43 for free rotational movement. Four inner wall segments 44, 44a, 44b and 44c are positioned concentric to rotor shaft 42 and are spaced therefrom such that there is just sufficient clearance between the peripheral surface 41 of rotor 40 and the inner faces 45, 45a, 45b, 45c of the wall segments at the point of maximum eccentricity to permit free movement of the rotor. A crescent-shaped chamber is thus defined between the surfaces 45, 45a, 45b, 45c and rotor surface 41. The crescent chamber is divided into four work chambers 46, 46a, 46b, 46c by four radially movable divider members which in this case are rollers 47, 47a, 47b, 47c.

A movable ring member 48 circumscribes rollers 47, 47a, 47b and 47c and has an inner surface 49 in contact therewith and spaced from wall segments 44, 44a, 44b, 44c such that four outer chamber 50, 50a, 50b, 50c are defined around wall segments 44, 44a, 44b, and 44c. As in the case of the previously described embodiment, suitable sealing means, not shown, may be provided between movable elements where required to provide a substantially gas-tight seal therebetween.

This embodiment operates according to the same general principles as the elliptical rotor embodiment. The eccentric motion of the rotor surface 41 as rotor 40 revolves radially reciprocates rollers 47, 47a, 47b and 47c imparting an oscillatory motion to movable ring 48. This motion synchronously increases and decreases the volume of chamber 50, 50a, 50b and 50c. Valving ports are provided to permit fuel charges to be taken into compression chambers 50, 50a 50b and 50c and subsequently compressed into an associated inner work chamber which, at the moment of ignition, is at a point of maximum offset respect to the rotor axis 42.

In the embodiment shown in FIG. 5, ports 52, 52a, 52b and 52c are provided in the casing wall. These ports, which are connected to a source of fuel mixture, are opened and closed by the movement of ring 48 to permit fuel charges to be taken into chambers 50, 50a, 50b, 50c respectively when they are near their maximum volume and to be compressed into a work chamber as the volume is decreased by the movement of ring 48.

Work chamber inlet ports 53, 53a, 53b, 53c are provided to transfer the compressed fuel charges to the work chambers. These ports consist of dished grooves formed in the casing and positioned and dimensioned such that they are opened and closed by the end walls of rollers 47, 47a, 47b and 47c respectively as they are radially reciprocated.

Exhaust ports 54, 54a, 54b and 54c are provided in the casing wall to permit removal of combuston gases. These ports are closed and opened by the side wall of the rotor 40 as it revolves.

As in the previous embodiment, in operation, fuel charges are taken into an outer chamber and compressed into an associated inner chamber by the movement of ring 48. Referring specifically to FIG. 5, with the rotor 40 in the position shown, a fuel charge has just been compressed from chamber 50c into work chamber 46. At this stage, chamber 50c is at a point of maximum offset with respect to the axis of the rotor and ignition of the fuel charge in the chamber will drive rotor 40 in the direction of the arrow in FIG. 6. At the same time, a fuel charge has been taken into chamber 50 and combustion products from a previously detonated charge are being exhausted from chamber 46c through open exhaust port 54c.

As rotor 40 revolves through 45° the work chamber shifts to a position ahead of and adjacent roller 47 and, at the same time, ring 48 reduces the volume of outer chamber 50 compressing the fuel charge therein into the newly positioned chamber 45 through inlet port 53a which is first opened and then closed by the inward radial movement of roller 47a. The charge is again detonated to drive the rotor. This process continues with a compression, detonation, expansion and exhaust cycle with every 45° of rotation.

It will be understood the many variations of the specific arrangements illustrated are contemplated by the invention. For example, the fuel mixture can be compressed into the inner work chambers by suitable compressor means which is separate from the rotary engine, rather than by the oscillatory action of the outer ring members 29 or 49. Also, numerous variations of the valving arrangements which would be equally as suitable as those illustrated, will be apparent to those skilled in the art.

What I claim as new and desire to protect by Letters Patent of the United States is:

1. A rotary internal combustion engine comprising a casing defining a cavity having a circular inner wall surface, a rotor centrally mounted for rotation within said cavity and having an elliptically curved peripheral surface with the apices thereof in movable but gas-sealing contact with said cavity inner wall surface such that said rotor defines a pair of opposed chambers between its peripheral surface and the inner wall surface of said cavity, radially movable divider means in movable but gas-sealing contact with said rotor peripheral surface for dividing each of said opposed chambers into work chambers which vary in volume and degree of offset with respect to the cavity axis as said rotor revolves, means for feeding gaseous fuel charges into said work chambers for an extraneous source when said work chambers are near a point of maximum offset such that said rotor is caused to revolve when said charges are ignited and expand within said chambers, and means for exhausting combusted fuel charges after expansion thereof.

2. A rotary internal combustion engine comprising a casing defining a cylindrical cavity having a circular end wall and substantially parallel side walls, a rotor centrally mounted for rotation within said cavity and having side wall portions in gas-sealing contact with said cavity side walls and an elliptically curved peripheral surface with the apices thereof in gas-sealing contact with said circular end wall, said rotor defining a pair of opposed chambers between its peripheral surface and the end wall of said cavity, radially movable divider means in gas-sealing contact with said rotor peripheral surface for dividing said chamber into work chambers which vary in volume and degree of offset with respect to the cavity axis as said rotor revolves, means for compressing gaseous fuel charges into said work chambers from an extraneous source when said work chambers are near a point of maximum offset, means for igniting said fuel charges to effect combustion and expansion thereof whereby said rotor is caused to revolve and means for exhausting combusted fuel charges after expansion thereof.

3. A rotary internal combustion engine comprising a cylindrical casing, a rotor with an elliptically curved peripheral surface mounted within said cavity on a shaft journalled for free rotational movement, fixed inner wall means circumscribing the rotor, radially movable divider means defining conjointly with said casing and inner wall means a series of work chambers around the peripheral surface of said rotor, said chambers varying in volume and relative position with respect to the rotor axis with rotational movement of said rotor, movable outer wall means circumscribing said inner wall means and defining conjointly with said casing and inner wall means a series of outer chambers around said inner wall means, means for oscillating said outer wall means within the casing responsive to the rotation of said rotor to sequentially increase and decrease the volume of each of said outer chambers, first inlet valve means for communicating said outer chambers with a supply of combustible fuel, second inlet valve means for communicating each of said outer chambers with an associated one of said work chambers, said first and second inlet valve means being adapted to permit charges of fuel to be introduced into said outer chambers when the volume thereof is increased and to be compressed into the associated inner chambers when their volume is decreased by the movement of said outer wall means, means for expanding the fuel charges compressed into said inner chambers such that said rotor is caused to rotate and means for exhausting the fuel charges after expansion.

4. The rotary internal combustion engine of claim 3 wherein said divider means comprises three equi-spaced radially slidable members positioned in the inner wall means and in constant gas-sealing contact with the peripheral surface of the rotor and the inner surface of said movable outer wall.

5. A rotary internal combustion engine comprising casing means having substantially parallel inner side walls, a rotor with an elliptically contoured peripheral surface mounted on an axis for rotation between said side walls; end wall means defining a series of inner chambers around the peripheral surface of said rotor which vary in volume and degree of offset with respect to the rotor axis as the rotor revolves; movable ring means circumscribing said end wall means and defining a series of outer chambers therearound; valve means communicating said outer chambers with said inner chambers; actuating means forming a part of said end wall means and responsive to the rotary movement of said rotor for oscillating said ring means to successively compress gaseous fuel charges through said valve means from said outer chambers into said inner chambers when said chambers are near a position of maximum offset with respect to the rotor axis; means for igniting said charges within said inner chambers whereby said rotor is caused to revolve and means for exhausting combustion gases from said inner chamber after each detonation.

6. The engine of claim 5 wherein said means for exhausting combusted gases comprises ports in the casing which are covered by the rotor during expansion of the ignited fuel charge and are uncovered as the rotor revolves following such expansion.

7. A rotary internal combustion engine as claimed in claim 7 wherein said end wall means comprises three fixed equi-spaced wall elements concentric with the axes of said rotor and defining a cylindrical cavity with three radial openings; divider members positioned in said openings and adapted for close fitting radial movement therebetween, said members being in contact with the peripheral surface of the rotor on one side and with the inner surface of the movable ring member on the other side.

8. A rotary internal combustion engine comprising a pair of spaced-apart, substantially parallel casing members; three fixed wall segments extending between said casing members and defining a cylindrical cavity with three equi-spaced radial openings; a shaft concentric with said cavity and journalled in said casing members for free rotation therein; a rotor fixed to said shaft having side walls in movable gas-sealed relationship with said casing members and having an elliptically contoured peripheral surface with a major diameter slightly less than the diameter of said cavity; a divider member positioned within each of said radial openings and adapted for sliding radial movement therein, each of said dividers having an end surface in contact with the rotor peripheral surface; said casing members, fixed wall segments and dividers conjointly defining a series of work chambers around the peripheral surface of said rotor with said surface providing a movable wall of each of said work chambers such that the volume and relative degree of offset of said chambers with respect to the rotor axis varies as the rotor revolves; a ring member extending between the said casing members and circumscribing the said dividers and fixed wall segments, said ring being adapted for free oscillating and rotational movement between said casing members and having a cylindrical inner surface in contact with the other ends of said dividers; said ring inner surface, casing members an dividers conjointly defining a series of outer compression chambers around said fixed wall segments with the inner surface of said ring member providing a movable wall of each of said outer chambers; first inlet ports formed in said casing in position to be sequentially opened and closed by the movement of said ring member such that fuel charges can be admitted to said outer chambers and compressed therein; second inlet ports communicating said outer chambers and said associated inner work chambers and adapted to be opened and closed by the radial movement of said dividers in synchronism with the compression of fuel charges in said outer chambers such that said charges are compressed into said work chambers through said second inlet ports when the work chambers are near the point of maximum offset with respect to the rotor axis; means for igniting compressed fuel charges in said work chambers such that they expand to impart a rotary motion to said rotor and means for exhausting combusted fuel charges from said inner chambers after detonation.

References Cited

UNITED STATES PATENTS

| | | | |
|---|---|---|---|
| 2,200,198 | 5/1940 | Beach | 230—152 |
| 3,136,304 | 6/1964 | Tauscher | 123—16 |
| 3,165,093 | 1/1965 | Etxegoien | 123—16 |
| 3,227,145 | 1/1966 | Bernard | 123—16 |
| 3,358,653 | 12/1967 | Grimm | 123—16 |

WILLIAM E. WAYNER, Primary Examiner

U.S. Cl. X.R.

230—152